(12) United States Patent
Zurek

(10) Patent No.: US 10,132,629 B2
(45) Date of Patent: Nov. 20, 2018

(54) CARPENTER'S LEVEL ATTACHMENT FOR HANGING PICTURES

(71) Applicant: Steven Zurek, Roselle, IL (US)

(72) Inventor: Steven Zurek, Roselle, IL (US)

(*) Notice: Subject to any disclaimer, the term of this patent is extended or adjusted under 35 U.S.C. 154(b) by 191 days.

(21) Appl. No.: 15/330,743

(22) Filed: Nov. 1, 2016

(65) Prior Publication Data

US 2018/0120102 A1     May 3, 2018

(51) Int. Cl.
    *G01C 9/02*         (2006.01)
    *B25H 7/04*         (2006.01)

(52) U.S. Cl.
    CPC   *G01C 9/02* (2013.01); *B25H 7/04* (2013.01)

(58) Field of Classification Search
    CPC .................................................. G01C 9/02
    USPC .................... 33/332, 354, 379, 666
    See application file for complete search history.

(56) References Cited

U.S. PATENT DOCUMENTS

| | | | | |
|---|---|---|---|---|
| 1,011,262 | A | * | 12/1911 | Starrett .................. G01C 9/26 33/332 |
| 2,428,213 | A | * | 9/1947 | Gloede .................. B44D 3/225 33/41.1 |
| 2,656,609 | A | | 10/1953 | Siggson |
| 3,407,509 | A | * | 10/1968 | Martinez ................. B25H 7/04 33/379 |
| 3,516,165 | A | | 6/1970 | Pfeffer |
| 4,220,309 | A | | 9/1980 | Eisen et al. |
| 4,382,337 | A | | 5/1983 | Bendick |
| 4,473,957 | A | | 10/1984 | Faulkner |
| 4,648,185 | A | | 3/1987 | Brandimarte |
| 5,083,380 | A | | 1/1992 | Robertson |
| 5,103,574 | A | | 4/1992 | Levy |
| 5,109,611 | A | | 5/1992 | Houck |
| 5,465,500 | A | | 11/1995 | Nammoto |
| 5,867,917 | A | | 2/1999 | Karon |
| 6,029,362 | A | * | 2/2000 | Miodragovic ........... B25H 7/00 33/483 |
| 6,185,831 | B1 | * | 2/2001 | Pluciennik ............. A47G 1/205 33/613 |
| 6,286,803 | B1 | | 9/2001 | Pellino et al. |
| 6,421,928 | B1 | | 7/2002 | Miller |
| 6,430,827 | B2 | | 8/2002 | Ruther |
| 6,978,551 | B2 | | 12/2005 | Krake et al. |
| 8,261,462 | B2 | | 9/2012 | Coyle |
| 9,038,982 | B1 | | 5/2015 | Marks |

(Continued)

FOREIGN PATENT DOCUMENTS

| | | |
|---|---|---|
| DE | 19749026 A1 | 5/1999 |
| FR | 2602044 A1 | 1/1988 |

*Primary Examiner* — G. Bradley Bennett
(74) *Attorney, Agent, or Firm* — Law Office of John W. Harbst

(57) ABSTRACT

A carpenter's level attachment system for hanging pictures is described and claimed. The attachment comprises a bridge portion and a marker portion. The bridge portion includes a first leg, a span, and a second leg. These legs and span are adapted to fit over the respective top, sides and bottom of a typical carpenter's level. A markers portion is affixed to the bridge portion and has means for leaving a mark on the wall on which the pictures are to be hung. Two or more attachments can be clamped to the carpenter's level so that, when the respective marker portions are actuated, two or more marks are left on the wall, and those marks are horizontally aligned.

15 Claims, 3 Drawing Sheets

(56) References Cited

U.S. PATENT DOCUMENTS

2013/0326895 A1* 12/2013 Bureau .................... G01C 9/26
33/381
2018/0156612 A1* 6/2018 Miller ...................... G01C 9/02

* cited by examiner

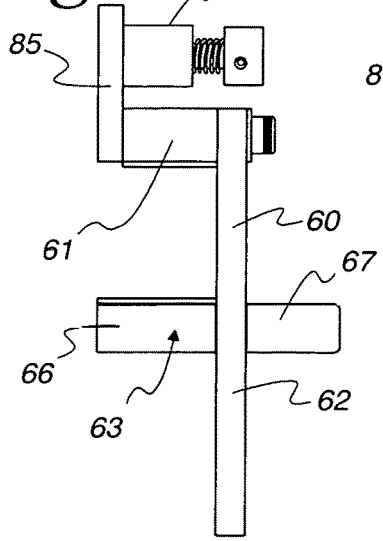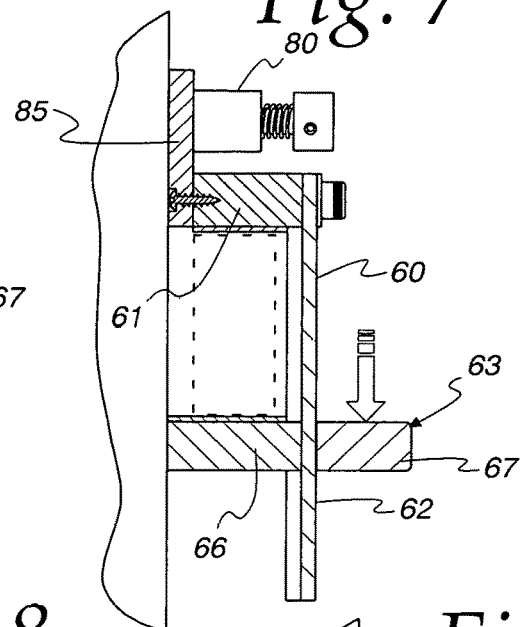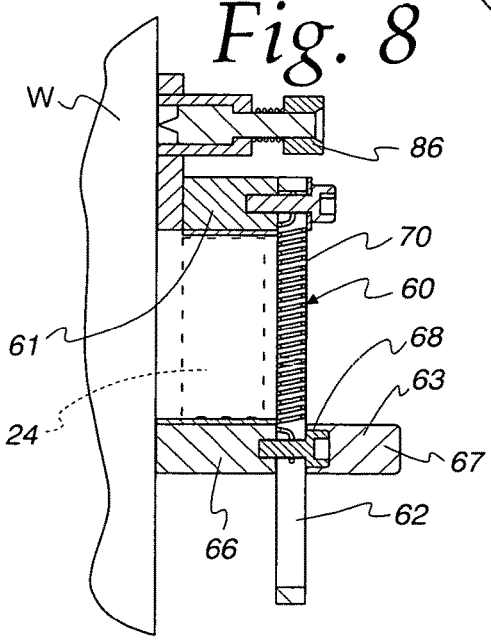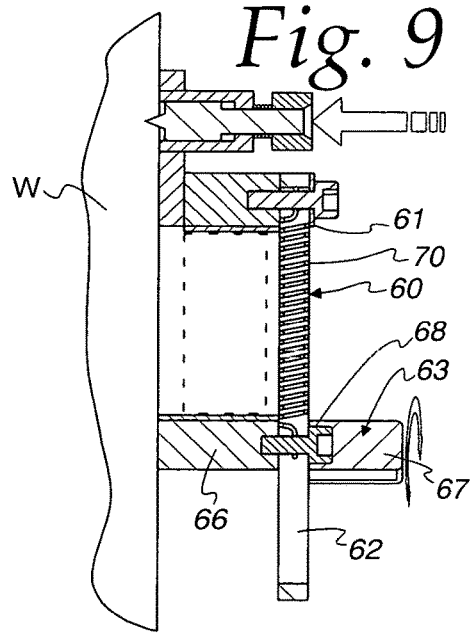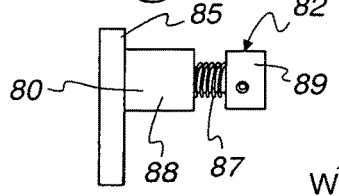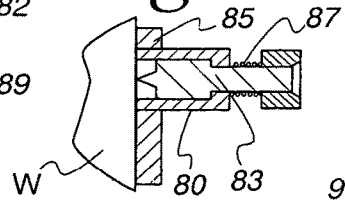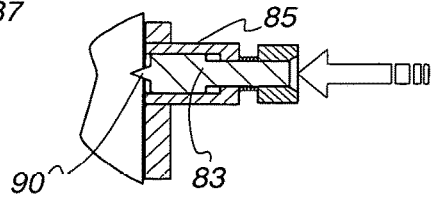

CARPENTER'S LEVEL ATTACHMENT FOR HANGING PICTURES

The precise placement of pictures on the walls in homes, offices and other interior spaces can present vexing problems, especially when it is desired to hang a large rectilinear picture so that the top and bottom edges of the picture are oriented precisely horizontally. A similar problem arises when it is desired to mount a series of pictures so that the top edges of those pictures are all aligned with one another and it is desired that the alignment be perfectly horizontal.

The use of a carpenter's level can provide precise horizontal alignment, but great difficulty can be experienced in performing the simultaneous tasks of holding the level in its desired position on a wall, marking that position and the corresponding horizontal line so as to be unobtrusive, and then locating the places for the hooks or other catchments on the wall in accordance with that horizontal line.

It is accordingly a general object of the present invention to provide a device which will easily and correctly align marks in a horizontal array on a vertical surface such as a wall.

It is another object of the invention to provide such a marking system which can be used with any typical carpenter's level.

Yet another object is to provide a marking system comprising one, two or more marking attachments which can be quickly and easily secured upon any typical carpenter's level at any desired positions.

A related object is to provide a system which permits the attachments to be removed from the level by simple and quick motions.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 6 is a side elevation view of an alternate embodiment of the attachment device.

FIGS. 7, 8, and 9 are partial sectional views taken substantially in the planes of lines 7, 8 and 9, respectively, in FIG. 2.

FIGS. 10, 11, and 12 are fragmentary views showing an alternate embodiment of a marker device.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

Figure 1:
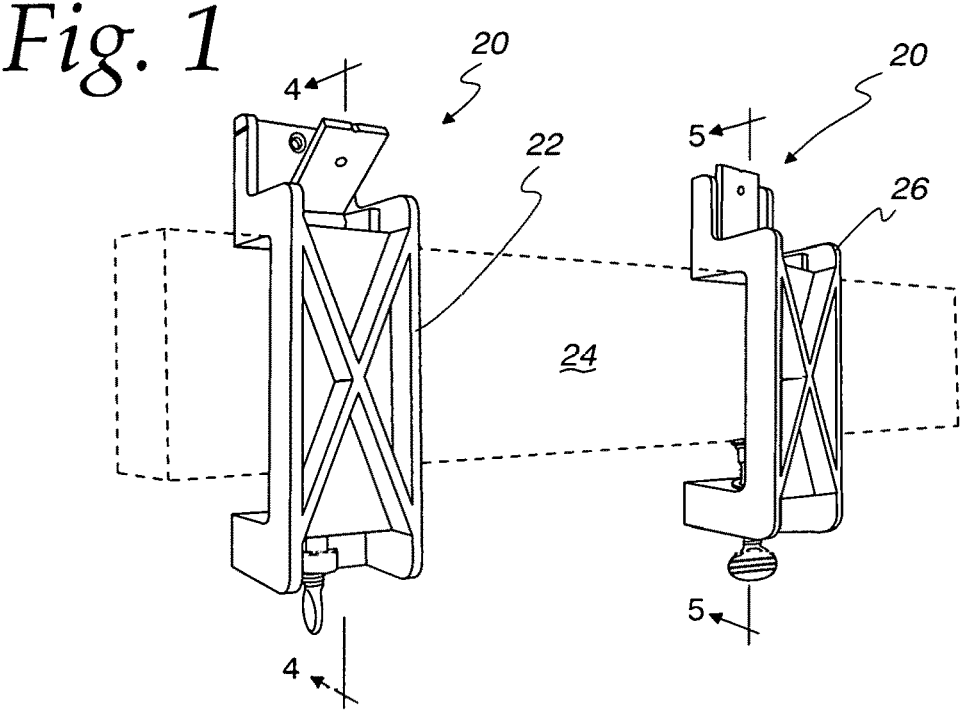
FIG. 1 is a perspective view of two attachment devices of the present invention as they appear when installed upon a typical carpenter's level.

Turning first to FIG. 1, there is shown a carpenter's level attachment system 20. The illustrated system embodying the invention comprises at least one attachment 22 adapted for attachment to a typical carpenter's level 24. In accordance with one aspect of the invention, a second attachment device 26, identical to the first attachment device 22, can be provided and secured upon the level 24 for providing two marks on a vertical surface such as a wall; the marks will be horizontally aligned with great accuracy.

Figure 3:
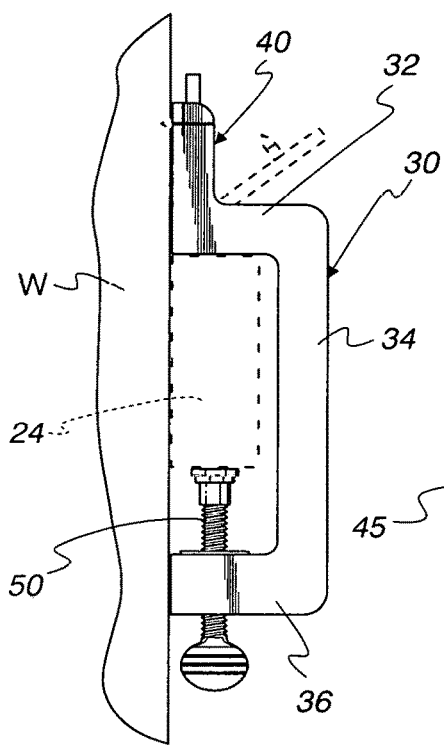
FIG. 3 is a side elevation view of an attachment device secured to a carpenter's level and showing a marking portion of the device in phantom lines.
Figure 4:
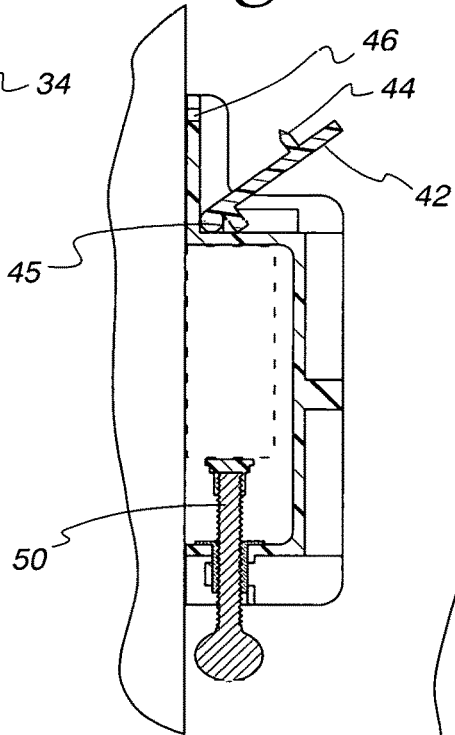
FIG. 4 is a side elevation view taken substantially in the plane of line 4-4 in FIG. 1 but showing the marking portion of the device in a partially retracted position.
Figure 5:
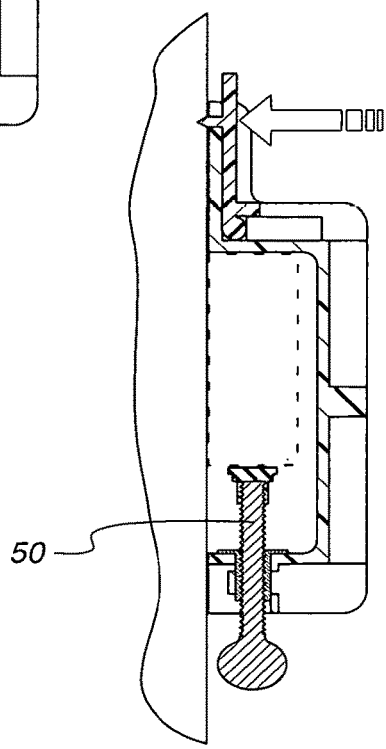
FIG. 5 is a side elevation view taken substantially in the plane of line 5-5 in FIG. 1 but showing a marking portion of the device in a marking position.

As shown in FIGS. 3, 4 and 5, a first embodiment of the attachment device here includes a bridge portion 30 comprising a first leg 32, a span 34 and the second leg 36. These legs 32, 36 and the span 34 are sized and arranged to fit over the respective top, outer side and bottom of the carpenter's level 24.

A marker portion 40 of the attachment 30 is affixed to the bridge portion 30. The marker portion 40 has means for leaving a mark on the wall. Here that marking means includes a push plate 42 and a marker pin 44 attached to the push plate 42. The marker pin 44 is hinged for rotation by any convenient means 45 and is adapted to selectively extend through a push plate aperture 46 sufficiently to leave a visible marker on the wall W.

It is important for the attachment or attachments to be secured and affixed in positions on the carpenter's level, of course. To this end, each attachment 30 includes a clamp 50 for clamping the attachment 30 to the carpenter's level 24. As shown in FIGS. 3, 4 and 5, this clamping member 50 can be a threaded clamping bolt. The bolt threads engage and extend through the leg 36 of the attachment bridge 30.

Figure 2:
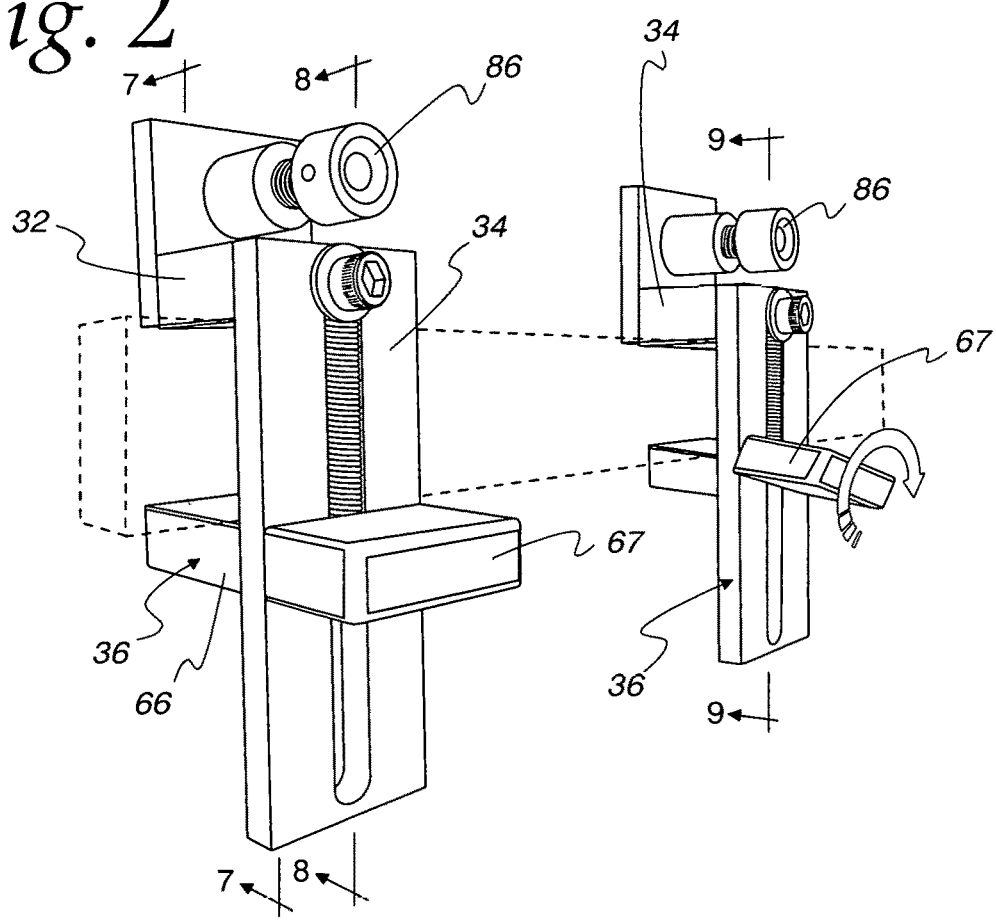
FIG. 2 is a perspective view of two attachment devices in forms alternative to the form shown in FIG. 1.

An alternate embodiment of the invention is shown in FIG. 6-12. Here the attachment bridge 60 includes a first fixed leg 61 and a span 62, but the second leg 63 is adapted for movement over a portion of the bridge span 60 so as to permit the bridge 62 to fit snugly on and over any one of various sizes of carpenter's levels. This second leg 63 includes a lower element 66 adapted to abut the wall W and an upper element 67 adapted to be selectively tightened against the first element 66 on the bridge 60. This arrangement can be provided by a bolt element 68 having threads of relatively extended pitch as suggested especially in FIGS. 8 and 9. As suggested in FIG. 2, when the upper portion 67 is twisted into a locked position, the first and second legs are engaged with the respective upper and lower edges of the carpenter's level and the second leg is locked in a predetermined position on the bridge span 34.

To draw the second leg 63 toward the carpenter's level 24, a tension spring element 70 extends between the upper and lower elements of the 61 and 63 to draw the legs into engagement with the carpenter's level 24 as shown in FIG. 8 and FIG. 9.

When the carpenter's level 24 and attachments are placed against the wall W in their desired positions, the marker mechanisms 80 can be actuated. Here these marker mechanisms comprise a button element 82 atop shank 83 which is adapted to slide into and partially through the marker plate 85. A coil spring 87 located between the body 88 and the head 89 normally biases the marker point 90 away from the wall W. When these button elements are actuated, they make and leave a mark on the wall W. As suggested in FIGS. 9 and 12, if two attachments are fitted to the carpenter's level and the level is properly oriented on the wall, the button elements can be actuated. The marks left on the wall will be horizontally aligned with great accuracy in accordance with the invention.

The invention claimed is:

1. A carpenter's level attachment system for providing marks on a vertical surface such as a wall, the system comprising at least one attachment adapted for attachment to the carpenter's level,
   that attachment comprising a bridge portion and a marker portion,
   the bridge portion including
   a first leg, a span and a second leg, the first leg, span and second leg being adapted to fit over the respective top, side and bottom of a typical carpenter's level, the marker portion being affixed to the bridge portion and having means for leaving mark on the wall.

2. An attachment system according to claim 1 wherein said marker position means for leaving a mark on the wail defines an aperture in the marker portion through which a marker can be inserted to leave the mark on the wall.

3. The attachment system according to claim 1 wherein said attachment marker portion further includes a push plate and an identifier marker attached to the push plate and adapted to selectively extend through the push plate sufficiently to leave a visible mark on the wall.

4. The attachment system according to claim 3 wherein said push plate is hinged to said attachment marker portion.

5. The attachment system according to claim 1 wherein the system comprises two or more of the said attachments, each attachment being adapted to fit over the same carpenter's level.

6. The attachment is a system according to claim 1 wherein said attachment includes a clamp for clamping the attachment to the carpenter's level.

7. The attachment system according to claim 6 wherein said clamp comprises a threaded clamp member, the clamp member thread engaging and extending through a leg of the attachment bridge.

8. The attachment system according to claim 1 wherein said attachment includes a marker affixed to a shank rocker plate, and a marker point.

9. The attachment system according to claim 1 wherein at least one of said bridge legs is adapted for movement over a portion of said bridge span so as to permit the bridge to fit snugly on and over any one of various carpenter's levels.

10. The attachment system according to claim 9 wherein said leg includes a lower element for location below the span to engage the carpenter's level at a lower side of the level, and an upper element for selectively tightening the lower leg in a predetermined position on the attachment span.

11. The attachment system according to claim 10 further including a tension spring element extending between the upper and lower elements of said leg to draw the first and second legs into engagement with the respective upper and lower edges of a carpenter's level.

12. The attachment system according to claim 1 further including means for enabling said upper element to be twisted into a locking configuration whereby said leg is locked into a fixed position on said bridge.

13. A method of horizontally aligning a plurality of marks on a wall or the like, comprising the steps of
   fitting an attachment to a carpenter's level, said attachment having a bridge portion comprising first and second spaced apart legs and a span connecting said legs; and a marker portion affixed to the bridge portion and extending therefrom and having an aperture therethrough which the marker can be pushed to mark and leave a mark on the wall,
   placing the carpenter's level against the wall at a desired location in a horizontal orientation;
   and actuating the marker portion of the attachment to make and leave a mark on the wall.

14. A method according to claim 13 further including the step of fitting a second attachment to the carpenter's level and actuating the marker portion of the second attachment to make and leave a second mark on the wall, the first and second marks on the wall being horizontally aligned.

15. A method according to claim 14 further including the step of clamping said first and second attachments to the carpenter's level.

* * * * *